(12) United States Patent
van Knokke

(10) Patent No.: US 7,109,632 B2
(45) Date of Patent: Sep. 19, 2006

(54) SURFACE WAVE SENSOR

(75) Inventor: Henri van Knokke, Niederwerrn (DE)

(73) Assignee: FAG Kugelfischer AG, (DE)

( * ) Notice: Subject to any disclaimer, the term of this patent is extended or adjusted under 35 U.S.C. 154(b) by 0 days.

(21) Appl. No.: 10/507,532

(22) PCT Filed: Mar. 12, 2003

(86) PCT No.: PCT/DE03/00777

§ 371 (c)(1),
(2), (4) Date: Nov. 19, 2004

(87) PCT Pub. No.: WO03/078950

PCT Pub. Date: Sep. 25, 2003

(65) Prior Publication Data

US 2005/0062364 A1    Mar. 24, 2005

(30) Foreign Application Priority Data

Mar. 14, 2002 (DE) .............................. 102 11 198

(51) Int. Cl.
*H01L 41/04* (2006.01)
(52) U.S. Cl. ................... 310/313 D; 310/346
(58) Field of Classification Search ............ 310/313 D, 310/322, 346
See application file for complete search history.

(56) References Cited

U.S. PATENT DOCUMENTS

| 1,982,421 A | 11/1934 | Emmons et al. .............. 148/31 |
| 6,144,332 A | 11/2000 | Reindl et al. |
| 6,388,360 B1 * | 5/2002 | Nysen et al. ........... 310/313 R |
| 2004/0071379 A1 | 4/2004 | Carrerot ..................... 384/565 |

FOREIGN PATENT DOCUMENTS

| DE | 195 14 342 | 2/1996 |
| DE | 100 18 621 | 10/2001 |
| EP | 0 295 111 | 12/1988 |
| EP | 0 936 447 | 8/1999 |
| GB | 2 291 651 | 1/1996 |
| JP | 61-82131 | 4/1986 |
| JP | 11071642 | 3/1999 |
| WO | WO 99/34168 | 7/1999 |

OTHER PUBLICATIONS

International Search Report dated Aug. 4, 2003.

* cited by examiner

*Primary Examiner*—David M. Gray
*Assistant Examiner*—Derek Rosenau
(74) *Attorney, Agent, or Firm*—Ostrolenk, Faber, Gerb & Soffen, LLP

(57) ABSTRACT

A surface acoustic wave sensor is applied to an object by an adhesive. There are reflectors on the sensor body used to determine expansion and contraction. Additional reflectors on a smoothed edge zone of the body remain at the same distance apart and the sensor temperature is determined from the difference signal between these reflectors. The edge zone is without the adhesive.

4 Claims, 1 Drawing Sheet

SURFACE WAVE SENSOR

PRIORITY CLAIM

This is a U.S. National stage of application No. PCT/DE03/00777, filed on 12 Mar. 2003. Priority is claimed on that application and on the following application: Country: Germany, Application 102 11 198.7, Filed Mar. 14, 2002.

FIELD OF THE INVENTION

The invention relates to a surface acoustic wave sensor which can be checked without the use of wires.

BACKGROUND TO THE INVENTION

Surface acoustic wave sensors (SAW sensors) which can be checked without the use of wires are nowadays used in many fields, since these sensors can transmit measurement data without the use of wires, and without their own power supply. Sensors such as these have thus already been used for a long time for pressure measurement, acceleration measurement, surface tension measurement and for the measurement of chemical characteristics. Since the measurement results from this surface acoustic wave sensor are temperature-dependent, temperature compensation must be carried out when transmitting the measurement result, in order to make it possible to deduce the actual measured values. One such surface acoustic wave sensor is described in EP-0619 906 B1. This document likewise discloses a method describing how the current temperature of the sensor can be determined from the radio signals that are sent back. The measurement result can be corrected for the temperature influence with the aid of this temperature information. The problem in this document is that two or more SAW sensors are required for the method described there.

OBJECT OF THE INVENTION

The object of the invention is thus to specify a surface acoustic wave sensor in which temperature determination and compensation can be carried out using very simple methods.

BRIEF DESCRIPTION OF THE INVENTION

The object is achieved by the invention. A surface acoustic wave sensor is applied to an object by an adhesive. There are reflectors on the sensor body used to determine expansion and contraction. Additional reflectors on a smoothed edge zone of the body remain at the same distance apart and the temperature of the object is determined from the difference signal between these reflectors. The edge zone is without the adhesive.

The essence of the invention is that an edge zone of the chip surface which is neither expanded nor compressed when mechanical loads are applied is used to produce a temperature difference signal. Two reflectors are incorporated in this smoothed edge zone of the SAW sensor, a short distance apart, for this purpose. Since these two reflectors are always at the same distance apart from one another irrespective of the mechanical load on the sensor, the temperature of the chip can be deduced directly from the difference signal between these two reflectors. This simple measure means that all that is necessary is to evaluate the time interval between these two signals. This time interval is then directly proportional to the current temperature of the SAW sensor.

DESCRIPTION OF A PREFERRED EMBODIMENT

Figure 1:
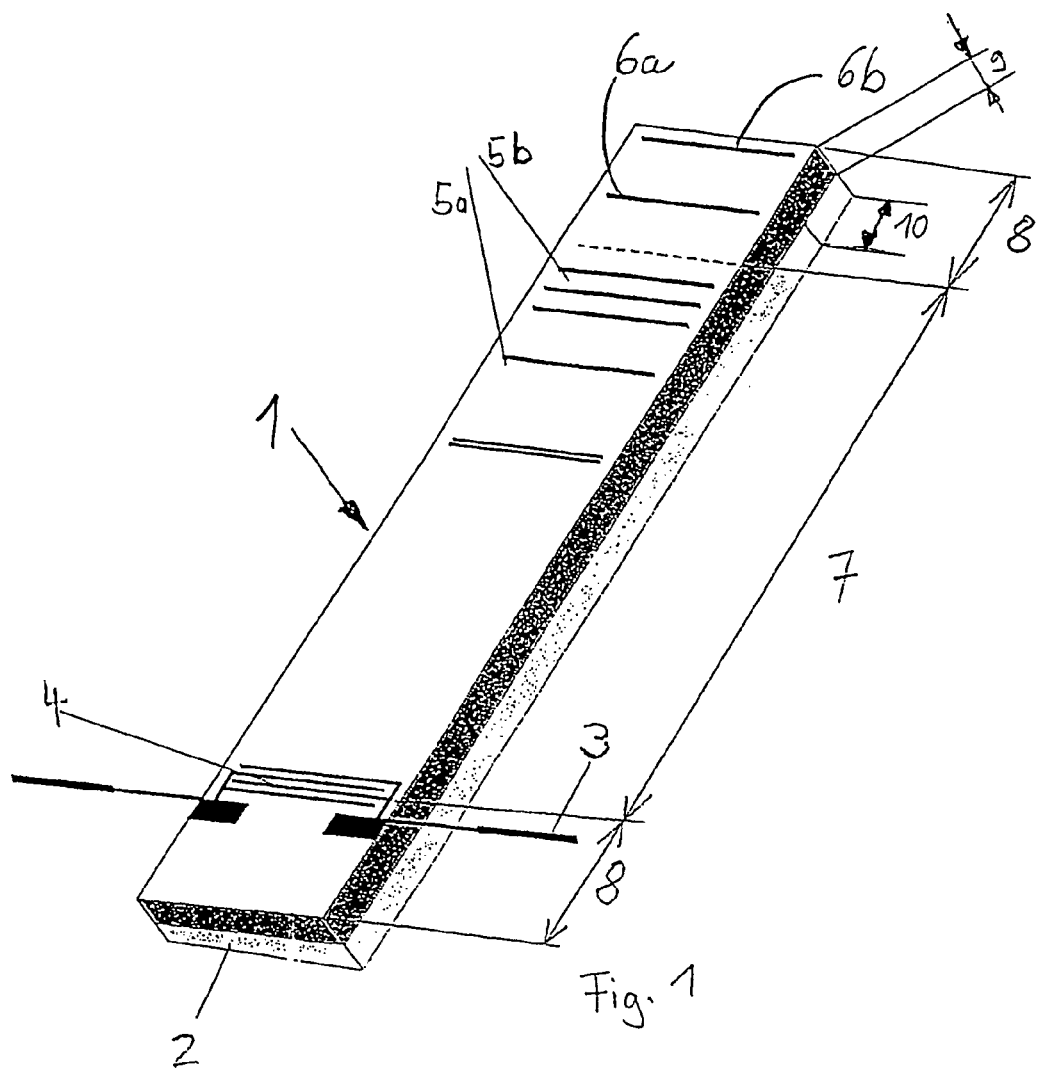
FIG. 1 shows a plan view of a surface acoustic wave sensor.

A surface acoustic wave sensor 1 is applied to the surface of a part to be measured (not shown), via a layer of adhesive. The adhesive 2 elastically transmits the length changes of the part to be measured to the surface acoustic wave (SAW) sensor. An antenna 3 via which the electromagnetic pulses are passed to the SAW sensor and are sent back again is illustrated schematically on the sensor. These electromagnetic waves are converted by a transducer 4 to mechanical waves, which run over the SAW sensor.

Depending on the object to be measured, reflectors 5a, 5b are fitted on the surface acoustic wave sensor. The area which is mechanically expanded and compressed during performance of measurement tasks on this sensor is identified by reference symbol 7. Two opposite outward edge areas 8 of the surface acoustic wave sensor are areas which are not expanded or compressed, owing to the mechanical characteristics of the adhesive and of the substrate material.

Additional reflectors 6a and 6b are arranged in one edge area 8. The distance between the reflectors 6a and 6b is very largely independent of the external load, and is thus always virtually constant. Practical trials have shown that the length of this smoothed edge area 8 corresponds approximately to three times the thickness 9 of the substrate material of the SAW sensor excluding the layer of adhesive. One possible way to enlarge the smoothed edge area 8 is to deliberately omit the adhesive 2, which applies the surface acoustic wave sensor to the substrate material, from the edge area 8. No forces are transmitted in the area without adhesive 10.

Figure 2:
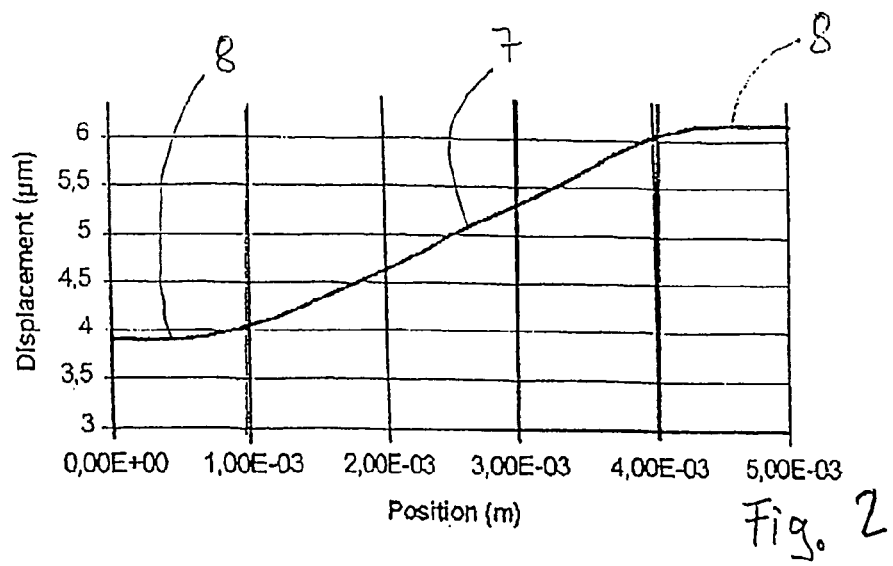
FIG. 2 is a graph showing displacement of points on the sensor during its use.

FIG. 2 illustrates the measurement result for a surface acoustic wave sensor which has been bonded onto a substrate material which has been extended for trial purposes. The measurement points along the surface acoustic wave sensor are plotted on the abscissa of this graph. The expansion of the surface acoustic wave sensor is illustrated on the ordinate of this graph. The two opposite smoothed edge zones 8 in which the sensor does not extend when loaded are represented by horizontal lines. The area 7, which responds in proportion to the expansion of the material to be measured is located between these lines. Additional reflectors are arranged in the area of the smoothed edge zones 8.

The invention claimed is:
1. A surface acoustic wave sensor comprising:
a sensor body having
a central part and opposite smoothed edge zones outward of the central part;
an antenna for the body,
a transducer for converting electromagnetic waves at the antenna into mechanical waves which run along the sensor body;
first reflectors on the sensor body and inward of the edge zones for together detecting changes in the spacing between the first reflectors due to change in the body; and
additional reflectors arranged at one of the smoothed edge zones in order to reflect signals which are used for evaluation of the current temperature.
2. The surface acoustic wave sensor as claimed in claim 1, wherein the smoothed edge zone on which the additional reflectors are disposed has a length outward of the central part that corresponds to approximately three times the thickness of the material of the sensor body.

3. The surface acoustic wave sensor as claimed in claim 1, further comprising an adhesive on a surface of the sensor body by which the sensor is mounted on a substrate material to be measured.

4. The surface acoustic wave sensor as claimed in claim 3, wherein the smoothed edge zone has the surface but is an area without the adhesive.

* * * * *